(12) United States Patent
Lin

(10) Patent No.: US 8,963,048 B2
(45) Date of Patent: Feb. 24, 2015

(54) HEATING ASSEMBLY, HEATING DEVICE, AND AUXILIARY COOLING MODULE FOR A BATTERY

(75) Inventor: Yu-Min Lin, Sinjhuang (TW)

(73) Assignee: Asia Vital Components Co., Ltd., New Taipei (TW)

(*) Notice: Subject to any disclaimer, the term of this patent is extended or adjusted under 35 U.S.C. 154(b) by 588 days.

(21) Appl. No.: 12/725,467

(22) Filed: Mar. 17, 2010

(65) Prior Publication Data
US 2011/0198335 A1 Aug. 18, 2011

(30) Foreign Application Priority Data
Feb. 12, 2010 (TW) ................................ 99104601 A

(51) Int. Cl.
*H05B 1/00* (2006.01)
*H05B 3/22* (2006.01)
(52) U.S. Cl.
CPC .......................................... *H05B 3/22* (2013.01)
USPC .......................................... 219/209; 219/520
(58) Field of Classification Search
CPC .................. H05B 3/22; H05B 2203/02; H05B 2203/037; H05B 2203/022; H05B 2203/026
USPC ......... 219/209, 203, 217, 205, 387, 385, 494, 219/549, 536, 538, 492, 543; 165/185, 10, 165/71, 41, 122, 104.27; 320/127, 120, 320/136, 162, 107, 134, 150, 108, 101; 429/26, 53, 56, 62, 66, 71, 82, 90, 99, 429/120

See application file for complete search history.

(56) References Cited

U.S. PATENT DOCUMENTS

| | | | | |
|---|---|---|---|---|
| 5,039,927 A | * | 8/1991 | Centafanti | 320/128 |
| 5,731,568 A | * | 3/1998 | Malecek | 219/209 |
| 2005/0078451 A1 | * | 4/2005 | Sauciuc et al. | 361/700 |
| 2005/0173414 A1 | * | 8/2005 | Ishii et al. | 219/549 |
| 2006/0132101 A1 | * | 6/2006 | Ambrosio et al. | 320/150 |
| 2006/0138123 A1 | * | 6/2006 | Ishii et al. | 219/549 |
| 2009/0111679 A1 | * | 4/2009 | Lu | 501/103 |

* cited by examiner

*Primary Examiner* — Henry Yuen
*Assistant Examiner* — Phuong Nguyen

(57) ABSTRACT

The invention includes a heating assembly, a heating device and an auxiliary cooling module for a battery. The heating assembly is connected to a battery and includes a heat-conducting element and a heating element. The heat-conducting element has at least one heat-absorbing portion and at least one heat-conducting portion. The heat-conducting portion is provided to correspond to the battery. The heating element has at least one first heating portion located to correspond to the heat-absorbing portion for heating the heat-absorbing portion. The other side of the heat-conducting element opposite to the battery is provided with a heat-insulating portion. The auxiliary cooling module is further provided with at least one cooling pipe in the heat-conducting element, thereby cooling the battery. With the heating assembly, the heating device, and the auxiliary cooling module of the present invention, the battery can be kept in a normal range of working temperature, so that the efficiency and lifetime of the battery can be increased greatly.

7 Claims, 9 Drawing Sheets

HEATING ASSEMBLY, HEATING DEVICE, AND AUXILIARY COOLING MODULE FOR A BATTERY

This application claims the priority benefit of Taiwan patent application number 099104601 filed on Feb. 12, 2010.

BACKGROUND OF THE INVENTION

1. Field of the Invention

The present invention relates to a heating assembly, a heating device, and an auxiliary cooling module for a battery, and in particular to a heating assembly, a heating device, and an auxiliary cooling module for a battery, which is capable of keeping the working temperature of the battery.

2. Description of Prior Art

In a situation that a wired AC power or DC power supply cannot be used, a battery is the most common way for people to supply electricity to, such as, cars, lights, electric tools, electronic apparatuses, communication apparatuses or heat exchange apparatuses. However, a common battery cannot supply electricity at low temperature ranging from −20° C. to −30° C. To prevent the failure of battery caused by the low-temperature environment, when working in the countries of the Frigid Zone and special working sites at low temperature, the battery has to be heated up to a working temperature to keep the normal operation of the battery.

Therefore, it is an important issue to control the amount of energy for heating the battery in an energy-saving manner.

SUMMARY OF THE INVENTION

In order to solve the above problems, an objective of the present invention is to provide a heating assembly for a battery, which is capable of heating the battery to achieve a normal range of working temperature.

Another objective of the present invention is to provide a heating device for a battery, which has a heat-insulating effect.

A further objective of the present invention is to provide an auxiliary cooling module for a battery, which has a heating assembly for heating and cooling the battery to achieve a normal range of working temperature and a heat-insulating assembly for preventing the dissipation of energy to external air and waste in energy when a heating element is heating the battery.

In order to achieve the above objectives, the present invention further provides a heating assembly, a heating device, and an auxiliary cooling module for a battery. The heating assembly is connected to a battery and comprises a heat-conducting element and a heating element. The heat-conducting element has at least one heat-absorbing portion and at least one heat-conducting portion. The heat-conducting portion is located to correspond to the battery. The heating element has at least one first heating portion located corresponding to the heat-absorbing portion for heating the heat-absorbing portion. One side of the heat-conducting element opposite to the battery is further provided with a heat-insulating portion, thereby achieving a heat-insulating effect. The heat-conducting element is further provided with at least one cooling pipe for generating a cooling effect. With the heating assembly, the heating device, and the auxiliary cooling module of the present invention, the normal range of working temperature of the battery can be kept to thereby increase the efficiency and lifetime of the battery greatly.

The present invention has advantageous features of (1) increasing the lifetime of the battery, (2) increasing the efficiency of the battery, and (3) saving energy.

DETAILED DESCRIPTION OF THE INVENTION

Figure 1:
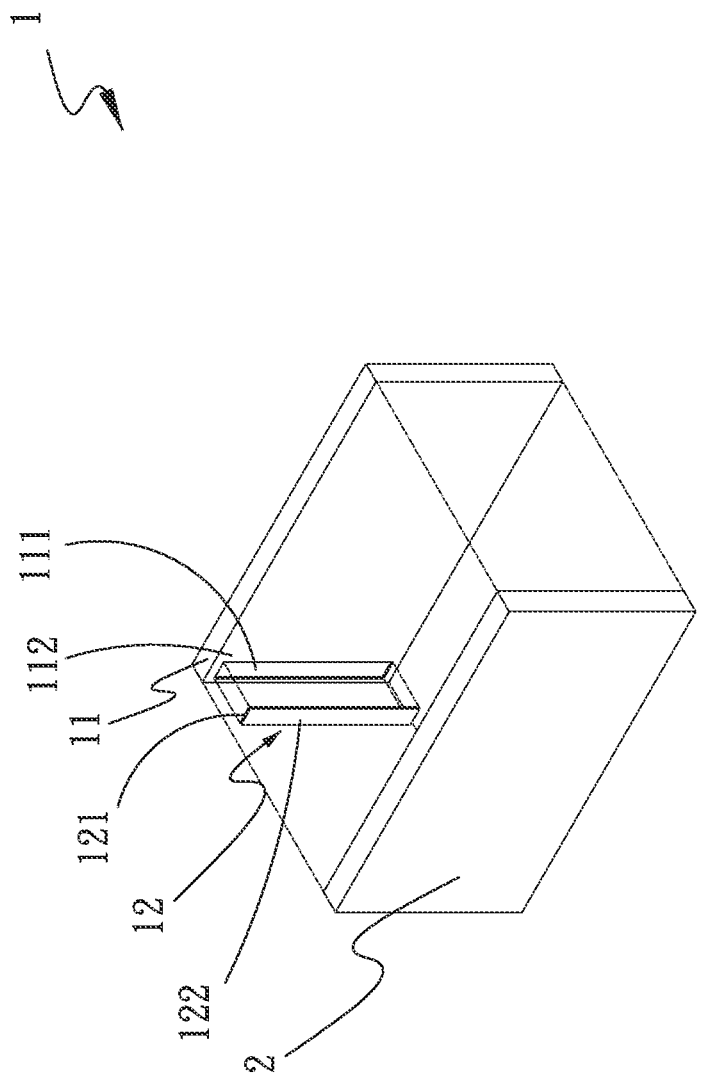
FIG. 1 is an exploded perspective view showing a heating assembly for a battery according to the present invention.
Figure 2:
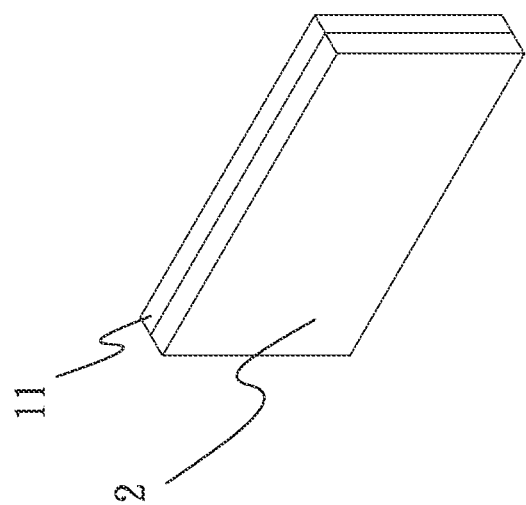
FIG. 2 is an assembled perspective view showing the heating assembly for a battery according to the present invention.

Please refer to FIGS. 1 and 2. FIG. 1 and FIG. 2 are the exploded perspective view and the assembled perspective view showing the heating assembly for a battery according to the present invention. The heating assembly 1 of the present invention is connected to a battery 2 and comprises a heat-conducting element 11 and a heating element 12.

The heat-conducting element 11 has at least one heat-absorbing portion 111 and at least one heat-conducting portion 112. The heat-conducting portion 112 is adhered to the battery 2.

The heat-conducting element 11 can be chosen from any one of a vapor chamber and a metal of high heat conductivity (such as copper heat sink or aluminum heat sink). In the present embodiment, the heat-conducting element 11 is a vapor chamber, but it is not limited thereto.

The heating element 12 has at least one first heating portion 121 located on one side of the heating element 12. The first heating portion 121 is provided to correspond to the heat-absorbing portion 111 for heating the heat-absorbing portion 111. The other side of the heating element 12 opposite to the first heating portion 121 is a second heating portion 122. The second heating portion 122 is provided to correspond to the battery 2 for heating directly the battery 2.

The heating element 12 is any one of a thermal resistor and/or quartz heater and/or positive temperature coefficient (PTC) thermal-sensitive resistor. In the present embodiment, the heating element 12 is a thermal resistor, but it is not limited thereto.

According to the present invention, the heating assembly 1 for a battery has advantageous features as follows. When the temperature of the battery 2 is lower than its normal range of working temperature, the heating element 12 of the heating assembly 1 activates to heat up the battery 2 and the heat-conducting element 11. The heat-conducting element 11 uniformly conducts the heat supplied by the heating element 12 to the battery 2, so that the temperature of the battery 2 can rise to its normal range of working temperature, thereby increasing the power-supplying efficiency of the battery 2.

Figure 3:
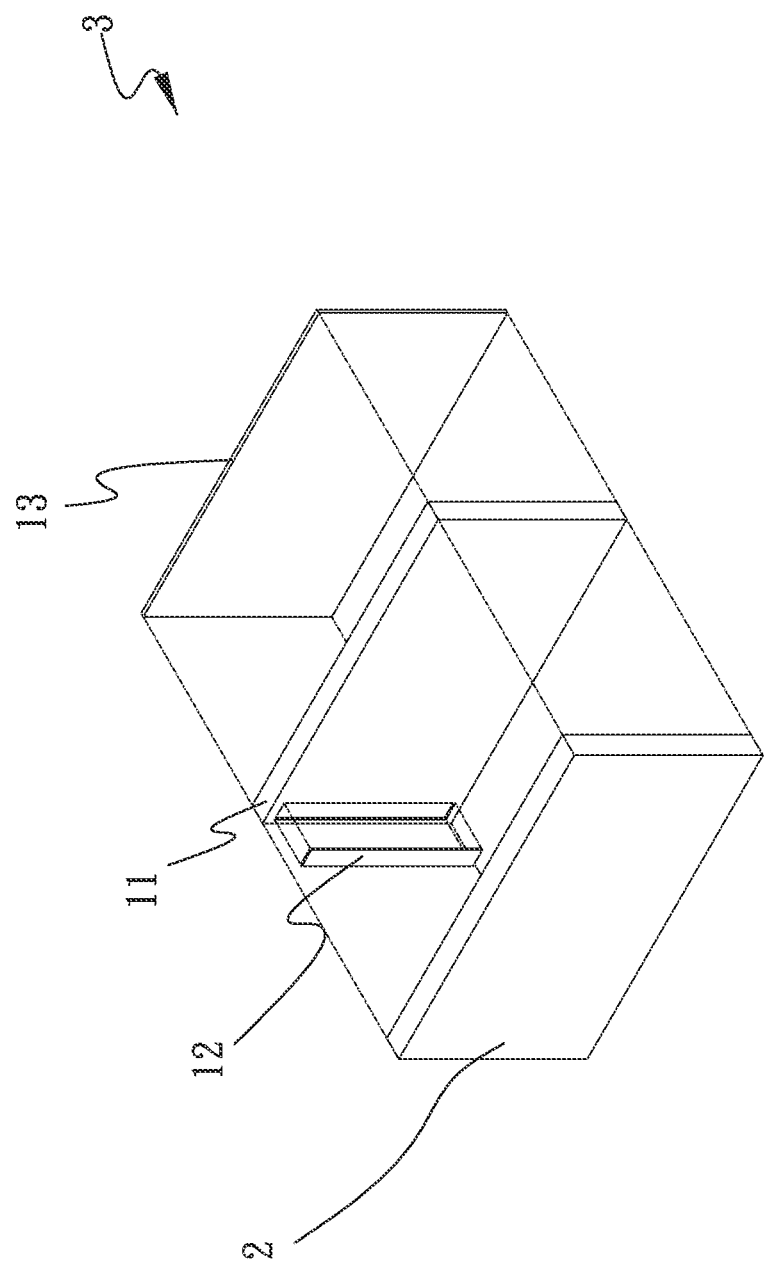
FIG. 3 is an exploded perspective view showing a heating device for a battery according to the present invention.
Figure 4:
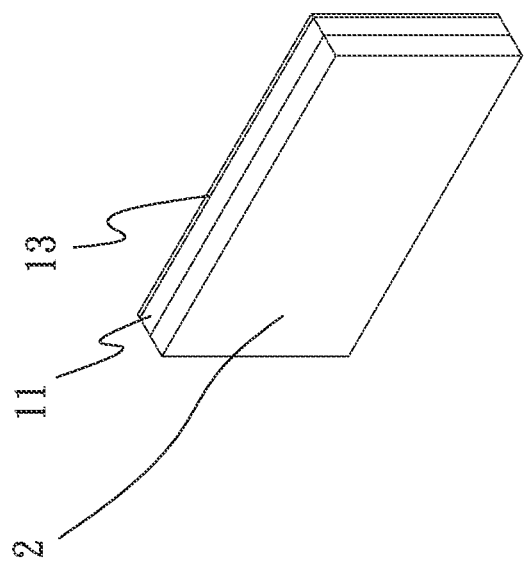
FIG. 4 is an assembled perspective view showing the heating device for a battery according to the present invention.
Figure 4A:
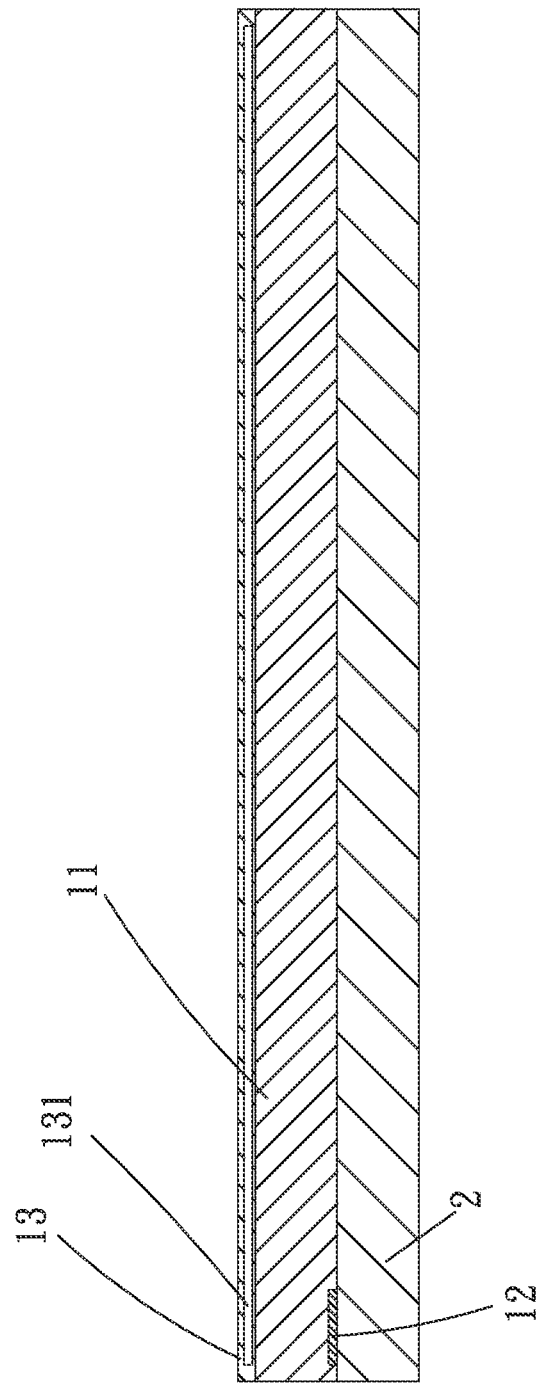
FIG. 4a is an assembled cross-sectional view showing the heating device for a battery according to the present invention.

Please refer to FIGS. 3, 4 and 4a, which show the heating device for a battery according to an embodiment of the present invention. As shown in these figures, the heating device 3 is connected to a battery 2 and comprises a heat-conducting element 11, a heating element 12, and a heat-insulating portion 13. The arrangement of the heat-conducting element 11 and the heating element 12 are substantially the same as that of the heating assembly 1, and thus the redundant description is omitted. The heat-insulating portion 13 is provided on one side of the heat-conducting element 11 opposite to the battery 2. The heat-insulating portion 13 is made by a vacuum chamber or a heat-insulating material 131. In the present embodiment, the heat-insulating portion 13 is a vacuum chamber, but it is not limited thereto.

The heating device 3 of the present invention can heat up the battery 2 to a normal range of working temperature to increase the power-supplying efficiency of the battery 2 by means of the heating assembly 1. In addition, the heating device 3 also has a heat-insulating effect because the heat-insulating portion 13 can thermally insulate the heating element 12, the heat-conducting element 11, and the battery 2 from other external elements. Thus, the heat of the heating element 12 can be protected from dissipating to external air.

Figure 5:
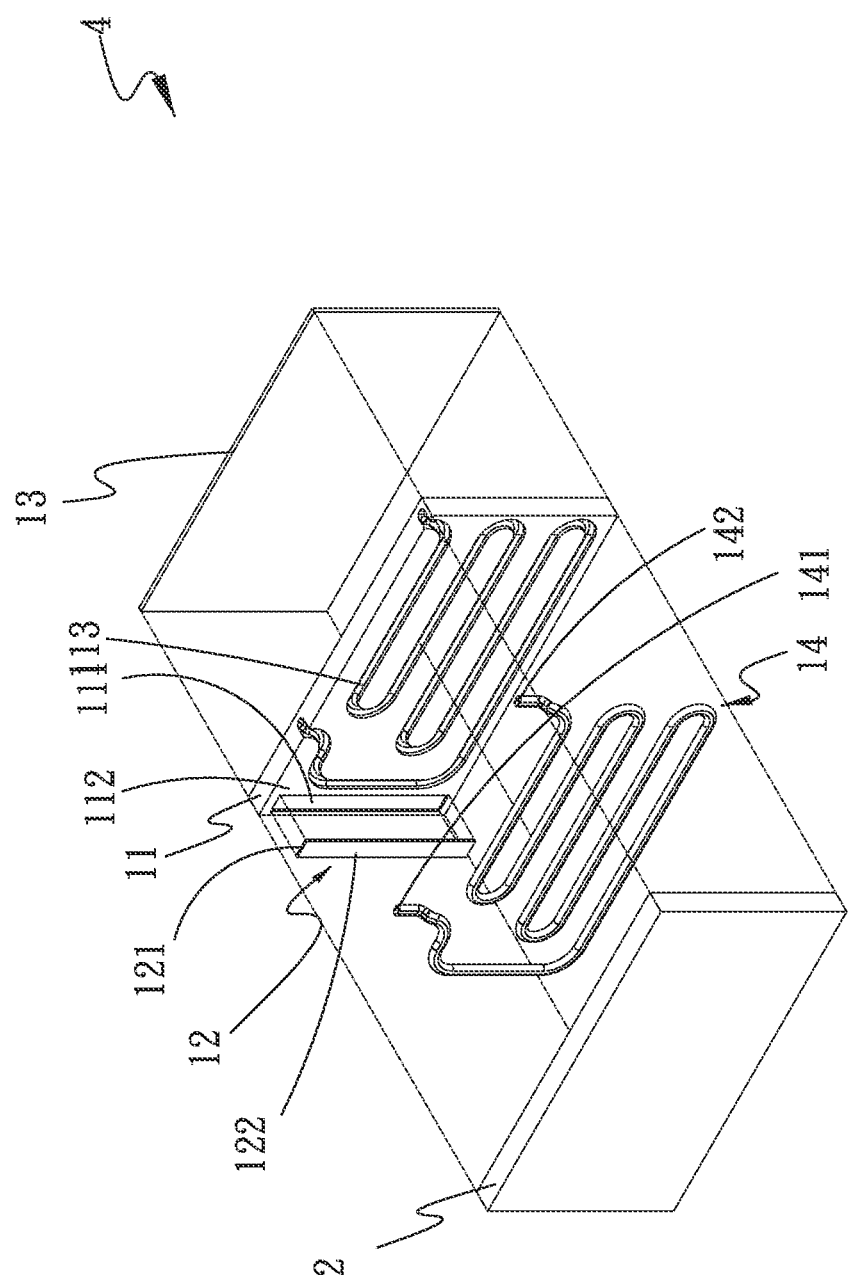
FIG. 5 is an exploded perspective view showing an auxiliary cooling module for a battery according to the present invention.
Figure 6:
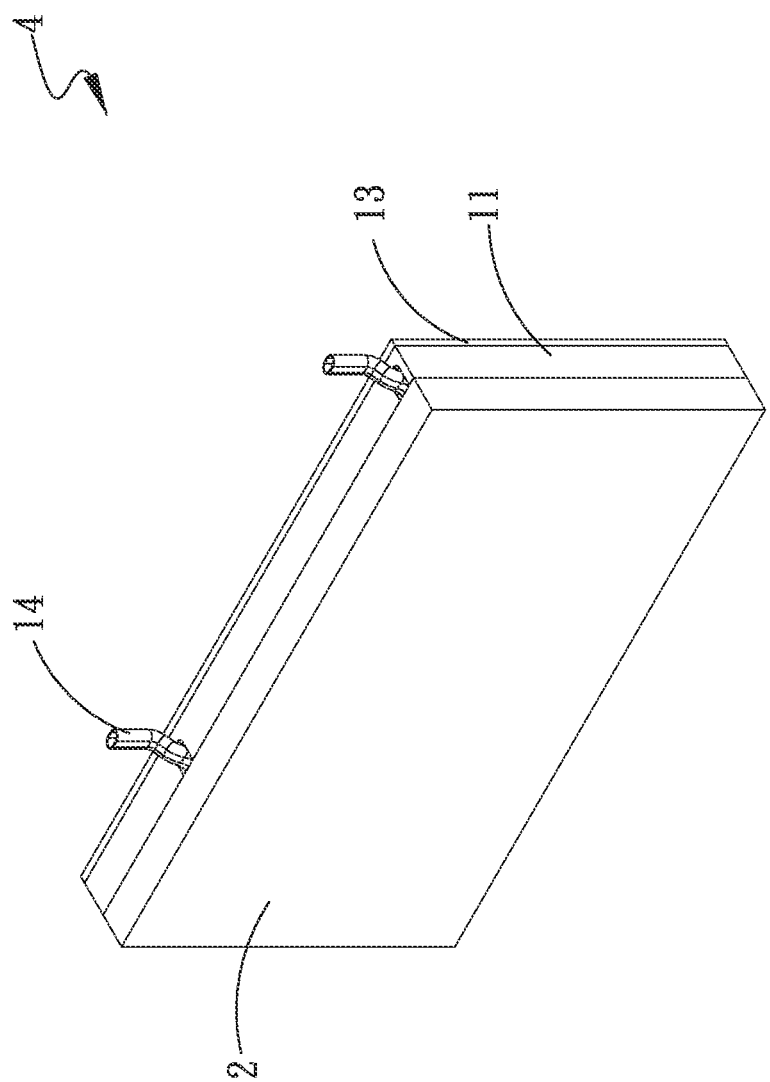
FIG. 6 is an assembled perspective view showing the auxiliary cooling module for a battery according to the present invention.
Figure 7:
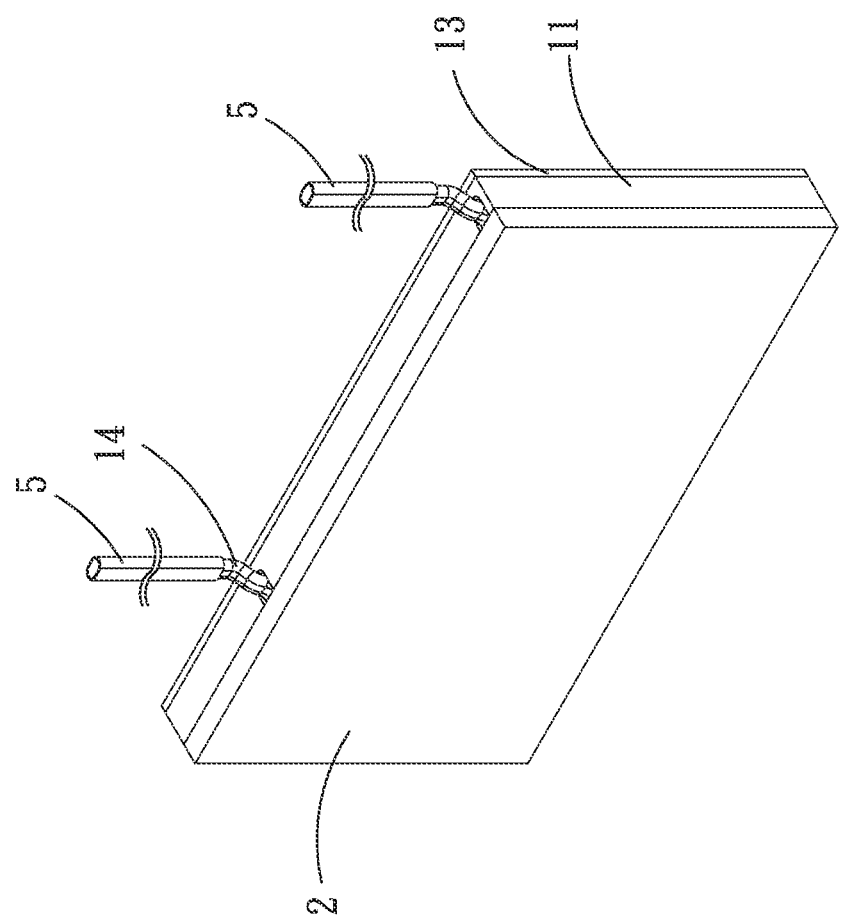
FIG. 7 is another assembled perspective view showing the auxiliary cooling module for a battery according to the present invention.
Figure 8:
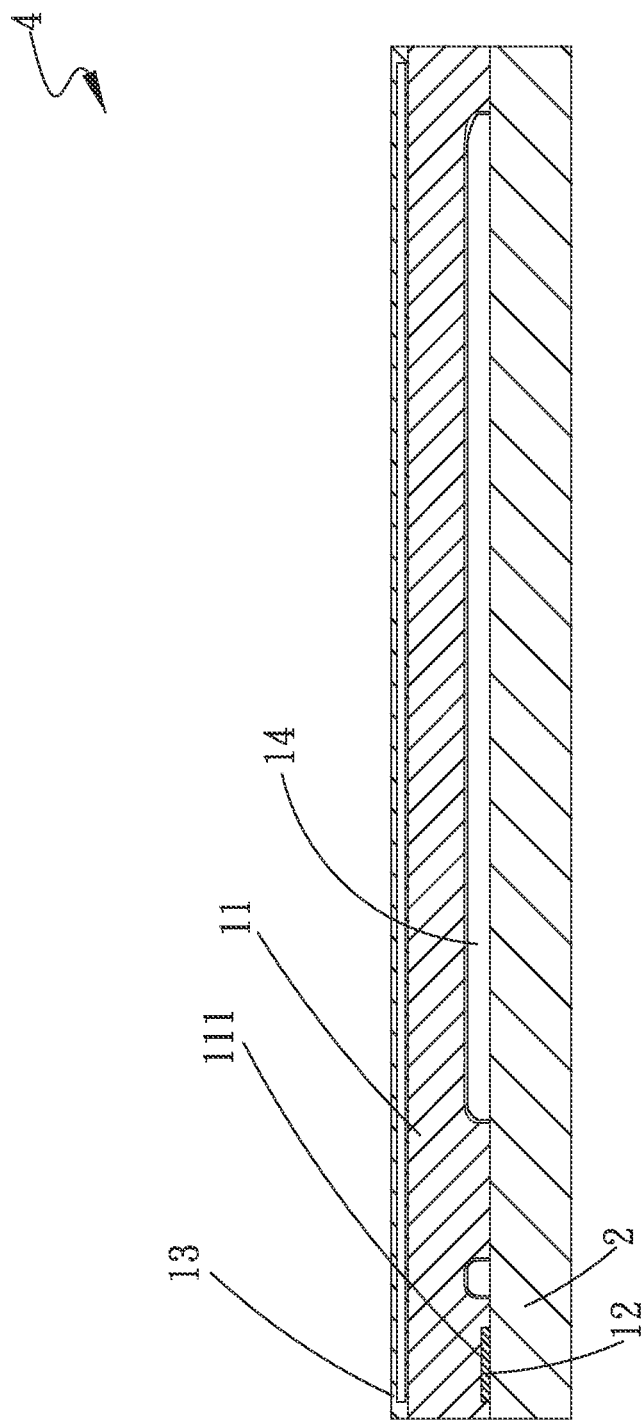
FIG. 8 is an assembled cross-sectional view showing the auxiliary cooling module for a battery according to the present invention.

Please refer to FIGS. 5 to 8. FIG. 5 is an exploded perspective view showing an auxiliary cooling module for a battery according to the present invention. FIG. 6 is an assembled perspective view showing the auxiliary cooling module for a battery according to the present invention. FIG. 7 is another assembled perspective view showing the auxiliary cooling module for a battery according to the present invention. FIG. 8 is an assembled cross-sectional view showing the auxiliary cooling module for a battery according to the present invention. As shown in these figures, the auxiliary cooling module 4 of the present invention is connected to a battery 2 and comprises a heat-conducting element 11, a heating element 12, a heat-insulating portion 13, and a cooling pipe 14. The arrangement of the heat-conducting element 11, the heating element 12, and the heat-insulating portion 13 is substantially the same as that in the heating assembly 1 or the heating device 2, and thus the redundant description is omitted. In the present embodiment, one side of the heat-conducting element 11 is provided with a trough 113. The cooling pipe 14 is provided in the trough 113. The cooling pipe 14 has at least one inlet 141 and an outlet 142. The inlet 141 and the outlet 142 are connected to at least one pipe 5 respectively.

The auxiliary cooling module 4 of the present invention has the same heating effect and the heat-insulating effect as the heating assembly 1 or the heating device 3. Further, the auxiliary cooling module 4 can also reduce the temperature of the battery 2. When the battery 2 continuously supplies electricity, its temperature will rise. If the temperature of the battery 2 exceeds its normal range of working temperature, the power-supplying efficiency of the battery 2 will be deteriorated. Thus, the cooling pipe 14 of the auxiliary cooling module 4 can be used to reduce the temperature of the battery 2.

Further, the heat-conducting element 11 of the auxiliary cooling module 4 uniformly distributes the heat of the battery 2, so that the temperature of the battery 2 can be kept uniform.

What is claimed is:

1. A heating and cooling assembly for a battery, connected to a battery and including:
   a heat-conducting element having at least one heat-absorbing portion and at least one heat-conducting portion, the heat-conducting portion being provided to correspond to the battery, said heat conducting element further including a recessed trough and a cooling pipe in the trough;
   a heating element having at least one first heating portion located to correspond to the heat-absorbing portion for heating the heat-absorbing portion; and
   wherein the heat-conducting element is selected from the group consisting of a vapor chamber and a conductive metal heat sink;
   wherein the heating element further has a second heating portion opposite to the battery for heating the battery directly;
   wherein the cooling pipe has at least one inlet and an outlet, the inlet and the outlet being connected to at least one pipe respectively; and
   wherein the heating and cooling assembly heats and cools the battery to achieve a normal range of working temperature and includes a heat-insulating assembly for preventing the dissipation of energy to external air and wasting energy when a heating element is heating the battery.

2. A heating and cooling device for a battery, connected to a battery and including:
   a heat-conducting element having at least one heat-absorbing portion and at least one heat-conducting portion, the heat-conducting portion being provided to correspond to the battery said heat conducting element further including a recessed trough and a cooling pipe in the trough;
   a heating element having at least one first heating portion located to correspond to the heat-absorbing portion for heating the heat-absorbing portion;
   a heat-insulating portion provided on the other side of the heat-conducting element opposite to the battery;
   wherein the heat-conducting element is selected from the group consisting of a vapor chamber and a conductive metal heat sink;
   wherein the heat-insulating portion is a vacuum chamber;
   wherein the heating element further has a second heating portion opposite to the battery for heating the battery directly;
   a cooling pipe having at least one inlet and an outlet, the inlet and the outlet being connected to at least one pipe respectively; and
   wherein the heating and cooling device heats and cools the battery to achieve a normal range of working temperature and includes a heat-insulating assembly for preventing the dissipation of energy to external air and wasting energy when a heating element is heating the battery.

3. An auxiliary heating and cooling module for a battery, connected to a battery and including:
   a heat-conducting element having at least one heat-absorbing portion, at least one heat-conducting portion, and a trough, the heat-conducting portion being provided to correspond to the battery, the trough being provided therein with at least one cooling pipe;
   a heating element having at least one first heating portion located to correspond to the heat-absorbing portion for heating the heat-absorbing portion;
   a heat-insulating portion provided on the other side of the heat-conducting element opposite to the battery;
   wherein the heat-conducting element is selected from the group consisting of a vapor chamber and a conductive metal heat sink;
   wherein the heating element further has a second heating portion opposite to the battery for heating the battery directly;

wherein the cooling pipe has at least one inlet and an outlet, the inlet and the outlet being connected to at least one pipe respectively; and wherein the heating and cooling module heats and cools the battery to achieve a normal range of working temperature and includes a heat-insulating assembly for preventing the dissipation of energy to external air and wasting energy when a heating element is heating the battery.

4. The auxiliary heating and cooling module for a battery according to claim 3, wherein the heat-conducting element is a vapor chamber.

5. The auxiliary heating and cooling module for a battery according to claim 3 wherein the heating element is chosen from any one of a thermal resistor, a quartz heater, and a positive temperature coefficient thermal-sensitive resistor.

6. The auxiliary heating and cooling module for a battery according to claim 3, wherein the heat-insulating portion is chosen from any one of a vacuum chamber and a heat-insulating material.

7. The auxiliary heating and cooling module for a battery according to claim 3, wherein the heating element further has a second heating portion opposite to the battery.

* * * * *